US008032581B2

(12) United States Patent
Hathorn et al.

(10) Patent No.: US 8,032,581 B2
(45) Date of Patent: Oct. 4, 2011

(54) PERSISTENT INFORMATION UNIT PACING

(75) Inventors: Roger Gregory Hathorn, Tucson, AZ (US); Daniel Francis Casper, Poughkeepsie, NY (US); John Flanagan, Poughkeepsie, NY (US); Catherine C. Huang, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 579 days.

(21) Appl. No.: 11/468,715

(22) Filed: Aug. 30, 2006

(65) Prior Publication Data
US 2008/0059638 A1 Mar. 6, 2008

(51) Int. Cl.
*G06F 15/16* (2006.01)
*G06F 15/173* (2006.01)
*G06F 13/00* (2006.01)

(52) U.S. Cl. ........ 709/201; 709/223; 709/224; 709/230; 709/232; 711/100; 711/145; 711/212

(58) Field of Classification Search ................. 709/201, 709/223, 224, 225, 230, 231, 232, 238; 711/100, 711/112, 113, 114, 145, 161, 212
See application file for complete search history.

(56) References Cited

U.S. PATENT DOCUMENTS

| 4,170,038 | A | 10/1979 | Bouvier et al. | |
|---|---|---|---|---|
| 6,920,537 | B2 | 7/2005 | Ofek et al. | |
| 7,200,697 | B1* | 4/2007 | Yamamoto et al. | 710/65 |
| 2001/0027486 | A1 | 10/2001 | Takamoto et al. | |
| 2002/0152338 | A1* | 10/2002 | Elliott et al. | 710/34 |
| 2003/0088638 | A1 | 5/2003 | Gluck et al. | |
| 2004/0085902 | A1 | 5/2004 | Miller et al. | |
| 2004/0202155 | A1 | 10/2004 | Natarajan et al. | |
| 2004/0210712 | A1* | 10/2004 | Katsuragi et al. | 711/112 |
| 2005/0036499 | A1* | 2/2005 | Dutt et al. | 370/401 |
| 2005/0188246 | A1* | 8/2005 | Emberty et al. | 714/5 |
| 2006/0004765 | A1 | 1/2006 | Anderson et al. | |
| 2006/0190550 | A1* | 8/2006 | Innan et al. | 709/212 |

OTHER PUBLICATIONS

Lin, et al., "Performance of High-Speed Network I/O Subsystems: Case Study of a Fibre Channel Network", IEEE, 1994, pp. 174-183.
"Fibre Channel Single-Byte Command Code Sets-3 Mapping Protocol", NCITS working draft proposed American National Standard for Information Technology, Mar. 26, 2003, pp. 1-206.
"FICON Over Extended Distances", McData, 2005, pp. 1-6.
"DFSMS Extended Remote Copy Reference Information for Advanced Users", IBM Corporation, Document No. GC35-0482-01, Jun. 2002, pp. 1-106.

(Continued)

*Primary Examiner* — William Vaughn, Jr.
*Assistant Examiner* — Farrukh Hussain
(74) *Attorney, Agent, or Firm* — Rabindranath Dutta; Konrad Raynes & Victor LLP

(57) ABSTRACT

Provided are a method, system, and article of manufacture, wherein a control unit receives a request to establish a relationship over a fiber channel connection, wherein a first indicator associated with the request indicates that the relationship supports persistent information unit pacing across a plurality of command chains. The control unit sends a response indicating an acceptance of the relationship, wherein a second indicator associated with the response indicates that the control unit supports persistent information unit pacing across the plurality of command chains. An information unit pacing parameter value is retained across the plurality of command chains, in response to determining that the second indicator indicates that the control unit supports persistent information unit pacing across the plurality of command chains.

20 Claims, 5 Drawing Sheets

OTHER PUBLICATIONS

Warrick et al., "IBM TotalStorage Enterprise Storage Server: Implementing ESS Copy Services with IBM eServer zSeries", IBM Corporation, Document No. SG24-5680-04, Jul. 2004, pp. 1-502.

Warrick et al., "IBM TotalStorage Enterprise Storage Server: Implementing ESS Copy Services in Open Environments", IBM Corporation, Document No. SG24-5757-04, Jul. 2004, pp. 1-642.

"DFSMS Advanced Copy Services", IBM Corporation, Document No. SC35-0428-07, Apr. 2005, pp. 1-707.

"DFSMS Extended Remote Copy Installation Planning Guide", IBM Corporation, Document No. GC35-0481-00, pp. 1-56.

U.S. Application entitled "Control of Information Units in Fibre Channel Communications", Serial No. unknown, filed Aug. 30, 2006, by inventors Roger G. Hathorn, Matthew J. Kalos, and William F. Micka.

International Search Report & Written Opinion received Nov. 27, 2007 for Application No. PCT/EP2007/058973 filed Aug. 29, 2007.

* cited by examiner

PERSISTENT INFORMATION UNIT PACING

BACKGROUND

1. Field

The disclosure relates to a method, system, and article of manufacture for persistent information unit pacing.

2. Background

Fibre Channel refers to an integrated set of architectural standards for data transfer being developed by the American National Standards Institute. Fibre Connection (FICON) is a protocol of the fibre channel architecture and may also be referred to by the formal name of FC-SB-3. Further details of FC-SB-3 may be found in the publication, "FIBRE CHANNEL Single-Byte Command Code Sets-3 Mapping Protocol (FC-SB-3)", Rev. 1.6, published by the American National Standards for Information Technology on Mar. 26, 2003.

A channel is a direct or a switched point-to-point connection between communicating devices. In the Fibre Channel architecture, a FICON channel may perform the functions specified by FC-SB-3 to provide access to Input/Output (I/O) devices by means of control units or emulated control units. FICON channels may rely on packet switching for transferring data between communicating devices. In FC-SB-3, a channel may also be referred to as an entity, typically of a host computer, which includes one N_Port and elements which perform the functions specified by FC-SB-3 to provide access to I/O devices by means of control units or emulated control units. Also, in FC-SB-3, a control unit may comprise a physical or emulated entity that includes at least one N_Port and elements which adapt the characteristics of one or more I/O devices to allow the attachment of the I/O devices to the N_Port of a channel.

A channel command word (CCW) is a control block which includes an I/O request, and may refer to a structure of a specific system architecture which specifies a command to be executed along with parameters. A channel program is a sequence of one or more channel command words executed sequentially that controls a specific sequence of channel operations. FICON channels may transmit up to sixteen channel command words at a time along with the associated data for any write operations, where a channel command word may be referred to as an "information unit".

SUMMARY OF THE DESCRIBED EMBODIMENTS

Provided are a method, system, and article of manufacture, wherein a control unit receives a request to establish a relationship over a fibre channel connection, wherein a first indicator associated with the request indicates that the relationship supports persistent information unit pacing across a plurality of command chains. The control unit sends a response indicating an acceptance of the relationship, wherein a second indicator associated with the response indicates that the control unit supports persistent information unit pacing across the plurality of command chains. An information unit pacing parameter value is retained across the plurality of command chains, in response to determining that the second indicator indicates that the control unit supports persistent information unit pacing across the plurality of command chains.

In certain embodiments, the relationship is a logical path, wherein the request comprises an establish logical path function in a fibre channel protocol, wherein the response is a logical path established response in the fibre channel protocol, wherein parameters of the establish logical path function and the logical path established response include the first and the second indicators, and wherein the first and the second indicators are bits.

In further embodiments, a command chain comprises a sequence of commands, wherein the information unit pacing parameter value is set to a number that is different from a default value of sixteen, and wherein the information unit pacing parameter value indicates the number of information units that can be in flight at any time across the plurality of command chains. A first sequence of commands is started, wherein the information unit pacing parameter value indicates the number of information units that can be in flight across the fibre channel connection during a processing of the first sequence of commands. A second sequence of commands is started in response to a completion of the processing of the first sequence of commands, wherein the information unit pacing parameter value remains unchanged, and wherein the information unit pacing parameter value indicates the number of information units that can be in flight across the fibre channel connection during a processing of the second sequence of commands.

In additional embodiments, the first indicator and the second indicator are included as an enhancement to a fibre channel protocol, wherein the enhancement to the fibre channel protocol supports persistent information unit pacing across the plurality of command chains.

In further embodiments, the control unit is included in a storage controller, wherein the request is received from a remote host coupled to the storage controller, wherein the information unit pacing parameter value is retained either on a logical path basis or on a physical path basis, and wherein the information unit pacing parameter value is capable of being reset to a default value.

BRIEF DESCRIPTION OF THE DRAWINGS

Referring now to the drawings in which like reference numbers represent corresponding parts throughout.

DETAILED DESCRIPTION

Figure 1:
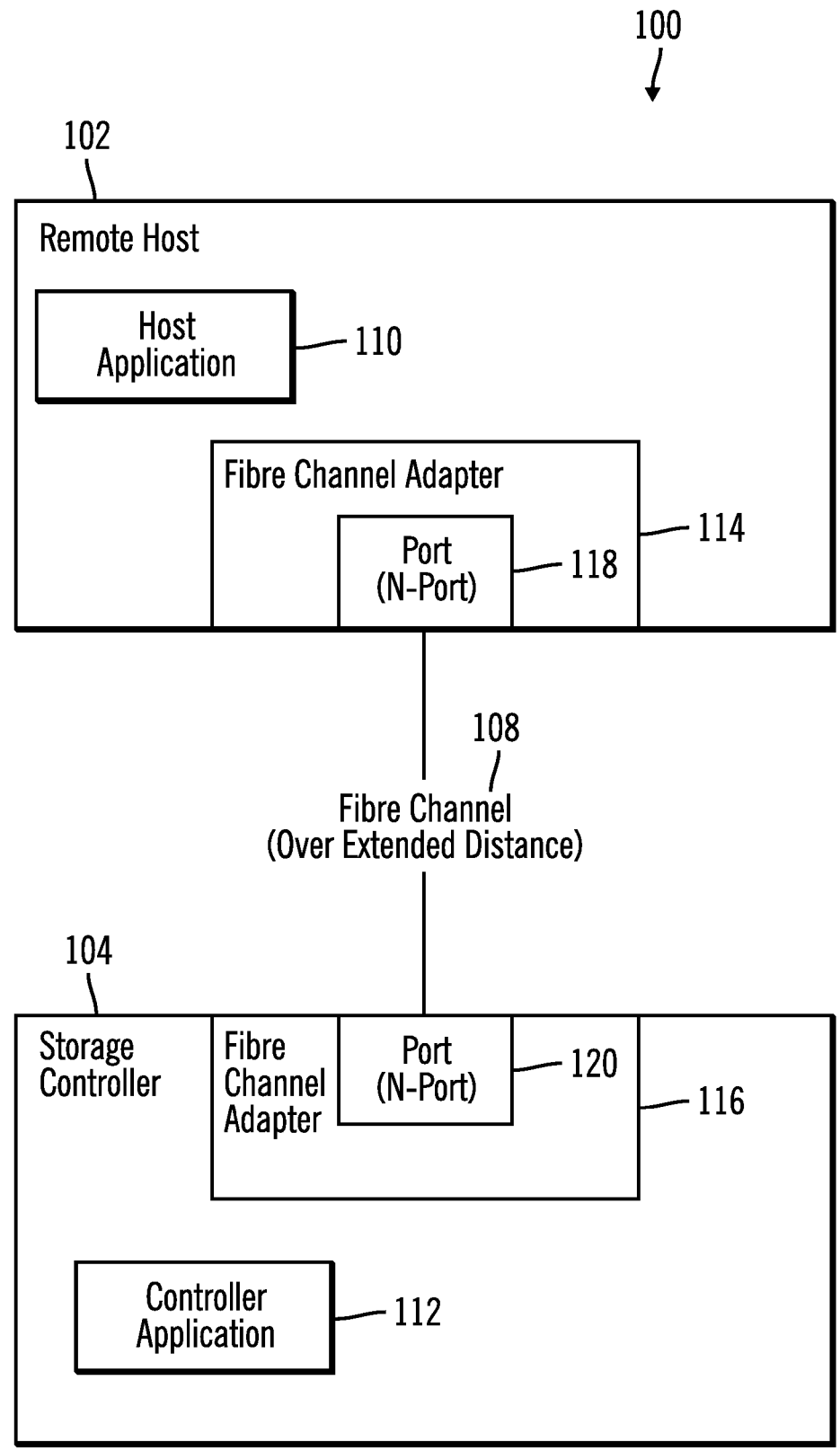
FIG. 1 illustrates a block diagram of a computing environment in accordance with certain embodiments.

In the following description, reference is made to the accompanying drawings which form a part hereof and which illustrate several embodiments. It is understood that other embodiments may be utilized and structural and operational changes may be made.

Information Unit Pacing Protocol

The FICON architecture defines an information unit (IU) pacing protocol that controls the number of information units that can be in flight from a channel to a control unit. The control unit may be enabled to increase the pacing count via the first command response information unit that is sent from the control unit to the channel, where the pacing count is the number of information units allowed to be in flight from the channel to the control unit. The increased pacing count is valid only for the remainder of a current outbound exchange, where an outbound exchange originates from the channel and carries information units from the channel to the control unit. In certain applications and at distances of over a hundred kilometers (or at shorter distances as link speeds increase), a performance benefit may be obtained by enabling the control unit to increase the pacing count.

The IU pacing protocol, as defined in the FICON architecture, has the limitation that the first burst of information units from the channel to the control unit may be no larger than a default value of 16. This may cause a delay in the execution of channel programs with more than 16 commands at large distances, such as distances of over a hundred kilometers (or at shorter distances as link speeds increase), because a round trip to the control unit may be needed before the remainder of the information units can be sent by the channel to the control unit. This may cause data rate droop at extended distances, such as distances beyond a hundred kilometers (the actual distance beyond which data droop is caused may depend on the link speed), because the control unit must receive the first group of 16 information units before requesting additional units according to the IU pacing protocol, thus adding additional round trips of communication between the channel and the control unit.

A control unit can adjust the value of the IU pacing parameter in the command response information unit, to modify the flow of information units within the FICON architecture, such that more than sixteen information units can be in flight at any point in time.

Persistent Information Unit Pacing

In FC-SB-3, a change in the IU pacing parameter remains in effect until the end of the current command chain or channel program. Certain embodiments that can be implemented with changes to FC-SB-3, allow the pacing parameter to be persistent and remain in effect for any new command chains on the logical path. Certain embodiments allow a FICON channel to retain a pacing count that can be used at the start of execution of a channel program. This may improve the performance of I/O programs at distances of over a hundred kilometers (or at shorter distances as link speeds increase) by allowing a channel to send the entire channel program to the control unit and by eliminating the delay of waiting for the first command response information unit.

Certain embodiments allow the channel to retain the pacing count value, presented by the control unit in accordance with FC-SB-3, and to use that pacing count value as the new default pacing count for any new channel programs issued on the same logical path. A logical path as defined by FC-SB-3 is the relationship established between a channel image of a channel and a control unit image of the control unit, where the logical path identifies a communication path over which device-level information may be transferred.

FIG. 1 illustrates a block diagram of a computing environment 100 utilizing a remote host 102 coupled to a storage controller 104. While FIG. 1 shows only a single remote host 102 and a single storage controller 104, in certain alternative embodiments a plurality of remote hosts may be coupled to a plurality storage controllers or other I/O units.

The remote host 102 may connect to the storage controller 104 through a data interface channel, such as fibre channel 108 or any other data interface mechanism known in the art.

The remote host 102 may be any suitable computational device presently known in the art, such as a personal computer, a workstation, a server, a mainframe, a hand held computer, a telephony device, a network appliance, etc. The remote host 102 may include any operating system known in the art, such as, the IBM OS/390* or the z/OS* operating system.

* z/OS and OS/390 are trademarks or registered of International Business Machines Corporation.

The remote host 102 may include a host application 110 and the storage controller 104 may include a controller application 112. The host application 110 may interface with the controller application 112 to access and manipulate data stored by the storage controller 104. The host application 110 and the controller application 112 communicate over the fiber channel 108.

Communications over the fibre channel 108 between the remote host 102 and the storage controller 104 may be enabled by a fibre channel adapter 114 included in the remote host 102 and a fibre channel adapter 116 included in the storage controller 104. The fibre channel adapter 114 included in the remote host 102 includes a port 118, and the fibre channel adapter 116 included in the storage controller 104 includes a port 120, where the ports 118 and 120 may be referred to as N-ports in fibre channel terminology. Fibre channel based communications via the FICON protocol may be performed between the port 118 of the remote host 102 and the port 120 of the storage controller 104. In the FC-SB-3 terminology, the port 118 may be included in a channel of the remote host and the port 120 may be referred to as being included in a control unit.

Therefore, FIG. 1, illustrates a computing environment 100 in which the host application 110 accesses and manipulates data in the storage controller 104 via the FICON protocol. In certain embodiments the distance between the remote host 102 and the storage controller 104 may exceed a hundred kilometers. The distance between the remote host 102 and the storage controller 104 at which certain embodiments may be deployed may depend on the link speed.

Figure 2:
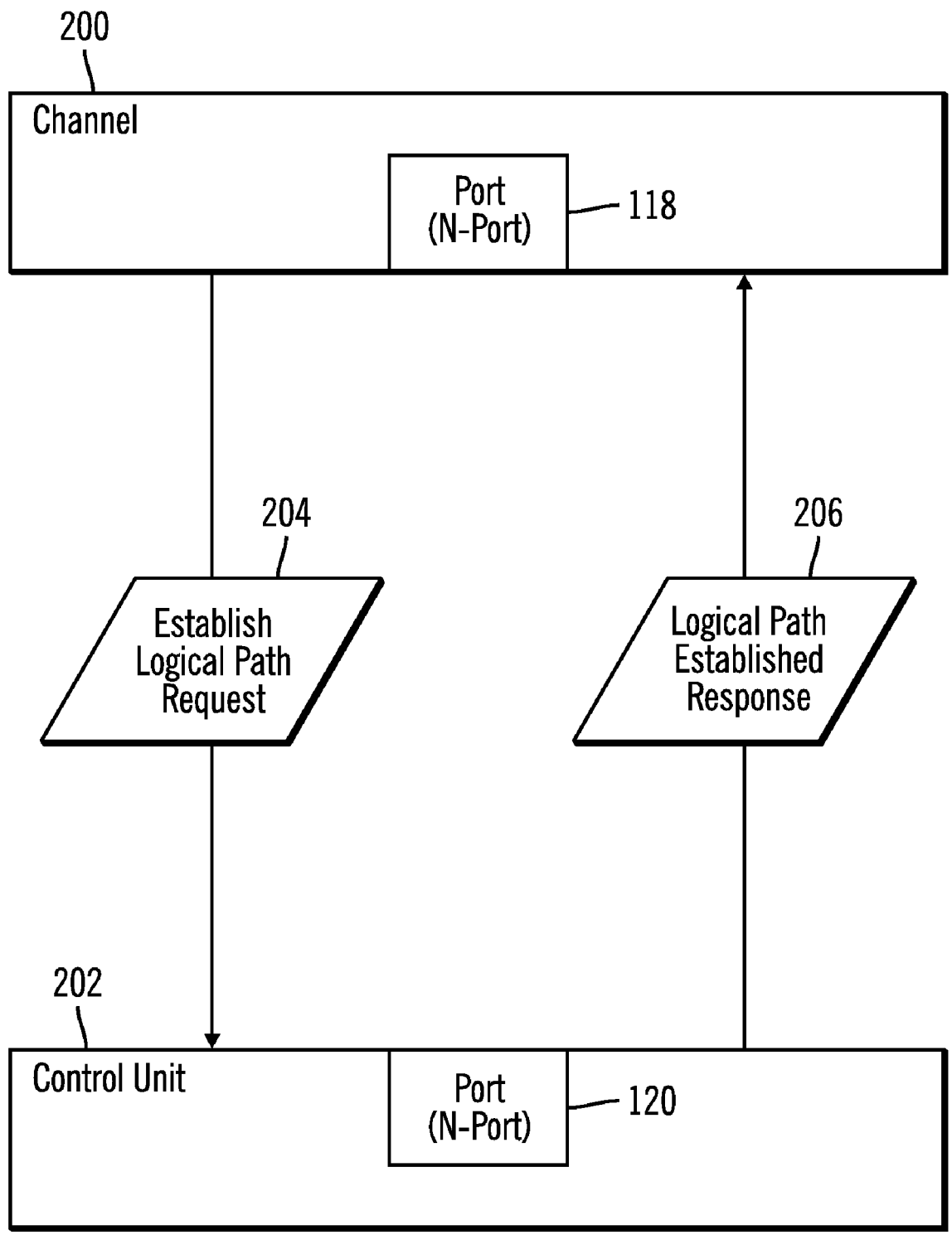
FIG. 2 illustrates a block diagram that shows communications between a channel and a control unit, in accordance with certain embodiments.

FIG. 2 illustrates a block diagram that shows communications between a channel 200 and a control unit 202 implemented in the computing environment 100, in accordance with certain embodiments.

In certain embodiments, the channel 200 is an entity of the remote host 102, and includes the port 118. The control unit 202 is an entity of the storage controller 104 and includes the port 120. A logical path may be established between the channel 200 and the control unit 202.

In certain embodiments, the channel sends an establish logical path (ELP) request 204 to the control unit 202 requesting the establishment of a logical path between in the channel 200 and the control unit 202. In response to receiving the establish logical path request 204, the control unit 202 may send a logical path established (LPE) response 206 to the channel 200 and establish the logical path.

In the current FICON architecture, a change in the pacing parameter remains in effect only until the end of the current command chain or channel program. FC-SB-3 describes the ability to enable optional features when an establish logical path request 204 is sent from the channel 200 to the control unit 202. In certain embodiments, persistent pacing can be enabled by defining a control bit in the parameters of the establish logical path request 204. A channel 200 that supports persistent pacing will set this control bit in the parameters of the establish logical path request 204 sent to the control unit 202. The control unit that supports persistent pacing may set a corresponding control bit in the logical path established response 206.

In certain embodiments illustrated in FIG. 2, the channel 200 may retain the value of the IU pacing parameter for a subsequent command chain if the control unit 202 indicated support for the retention of the value of the IU pacing parameter when the logical path was established by using the establish logical path request 204 and the logical path established response 206.

Figure 3:
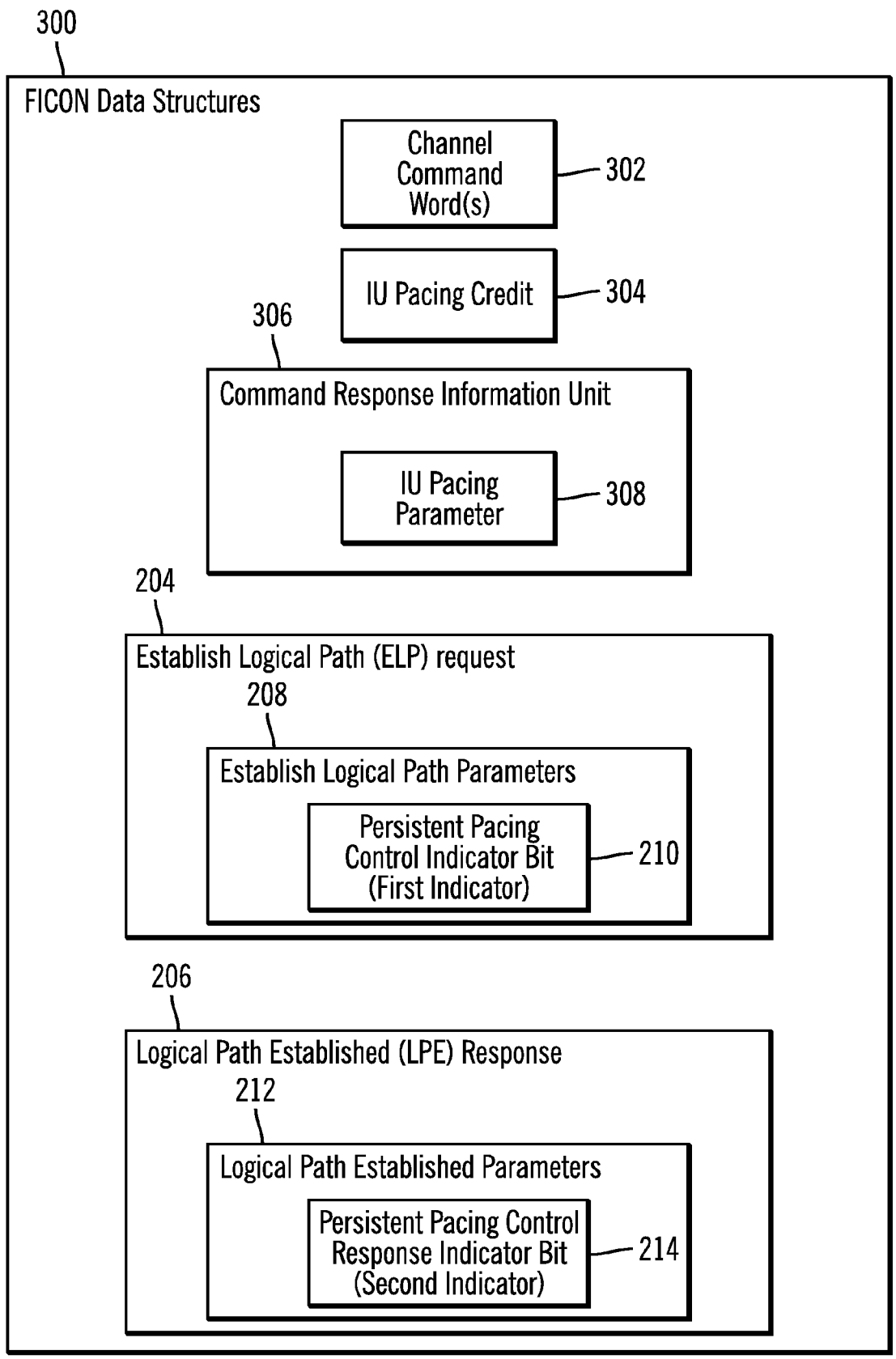
FIG. 3 illustrates data structures associated with a fibre connection, in accordance with certain embodiments.

FIG. 3 illustrates data structures associated with a fibre connection implemented over the fibre channel 108 in the computing environment 100, in accordance with certain embodiments. The data structures shown in FIG. 3 are referred to as FICON data structures 300.

The FICON data structures 300 include one or more channel command words 302, an information unit pacing credit 304, a command response information unit 306 having an information unit pacing parameter 308, where the information unit pacing parameter 308 is also referred to as an IU pacing parameter and the information unit pacing credit 304 may be referred to as a IU pacing credit. The FICON data structures 300 also include an establish logical path request 204 and a logical path established response 206.

The channel command words 302 are control blocks that include I/O requests. For example, in certain embodiments a channel command word 302 may include a read request from the host application 110 to the controller application 112, where the read request is a request for reading data stored by storage controller 104. The channel command words 302 may be sent from the channel 200 to the control unit 202. A channel command word 302 may also be referred to as an information unit.

In FC-SB-3, each channel 200 for fibre channel communications between the remote host 102 and the storage controller 104 provides the IU pacing credit 304 which may be initialized at either the start of each channel program or during a reconnection to continue the execution of a channel program. The IU pacing credit 304 is the maximum number of information units that the remote host 102 may send to the storage controller 104, before the remote host 102 receives the command response information unit 306 from the storage controller 104.

A command response information unit 306 is an information unit sent from the storage controller 104 to the remote host 102, in response to certain conditions. For example, a command response information unit 306 may be sent from the storage controller 104 to the remote host 102 in response to certain channel command words 302. The IU pacing parameter 308 associated with a command response information unit 306 may be sent from the port 120 of the storage controller 104 to indicate the maximum number of information units the remote host 102 may send over a channel. An IU pacing parameter 308 of zero may indicate that the storage controller 104 prefers to leave the default value of the IU pacing credit 304 unchanged or reset the IU pacing credit 304 to the default value of 16.

At the start of a channel program, the IU pacing credit 304 may be set to value no greater than the default value of 16. The control unit 202 may request that the IU pacing credit 304 be increased by the channel 200 at the start of a channel program or at each time the control unit 202 reconnects with device-end status. At the start of a channel program, the control unit 202 may request that the IU pacing credit 304 be increased by providing an IU pacing parameter 308 in either the command response information unit 306 or in status sent in response to the first command of a channel program. When reconnecting with device-end status, the control unit 202 may request that the IU pacing credit 304 be increased by providing the IU pacing parameter 308.

If the control unit 202 sets the IU pacing parameter 308 to a value less than or equal to a default value, the channel 200 will not increase the IU pacing credit 304 above the default value. If the control unit sets the IU pacing parameter 308 to a value greater than the default value, then the channel may increase the IU pacing credit 304 by any amount up to the value indicated by the IU pacing parameter 308.

At the start of a channel program or at each reconnection, the channel 200 may send a number of information units to the control unit 202. The number of information units sent may not exceed the value of the information unit pacing credit 304, where the value of the information unit pacing credit 304 is also referred to as information unit pacing credit value. Prior to or at the end of the sequence of command information units sent from the channel 200 to the control unit 202, the channel 200 may request a command response information unit 306 to be returned by the control unit 202.

The establish logical path request 204 may be sent from the channel 200 to the control unit 202 to indicate the optional features supported by the channel 200 and to request the establishment of a logical path between the channel 200 and the control unit 202. The logical path established response 206 from the control unit 202 confirms the successful completion of an establish logical path function request and the establishment of the logical path, and indicates the optional features to be used on all information units sent between the channel 200 and the control unit 202.

The establish logical path request 204 may be implemented via an establish logical path function with associated parameters referred to as establish logical path parameters 208. A persistent pacing control indicator bit 210 included in the establish logical path parameters 208 may indicate whether or not the channel 200 provides support for persistent pacing, i.e., the retention of the value of the information unit pacing parameter 308 across a plurality of command chains, where a command chain is a sequence of channel command words. Persistent pacing may also be referred to as persistent information unit pacing.

The logical path established response 206 may be implemented via a function with associated parameters referred to as logical path established parameters 212. A persistent pacing control response indicator bit 214 included in the logical path established parameters 212 may indicate whether or not the control unit 202 provides support for persistent pacing.

Therefore, FIG. 3 illustrates certain embodiments in which a first indicator referred to as a persistent pacing control indicator bit 210 and a second indicator referred to as a persistent pacing control response indicator bit 214 indicate whether or not a logical path established between the channel 200 and the control unit 202 enables persistent pacing. In certain embodiments, the first indicator 210 and the second indicator 214 are included as an enhancement to a fibre channel protocol, wherein the enhancement to the fibre channel protocol supports persistent information unit pacing across the plurality of command chains.

Figure 4:
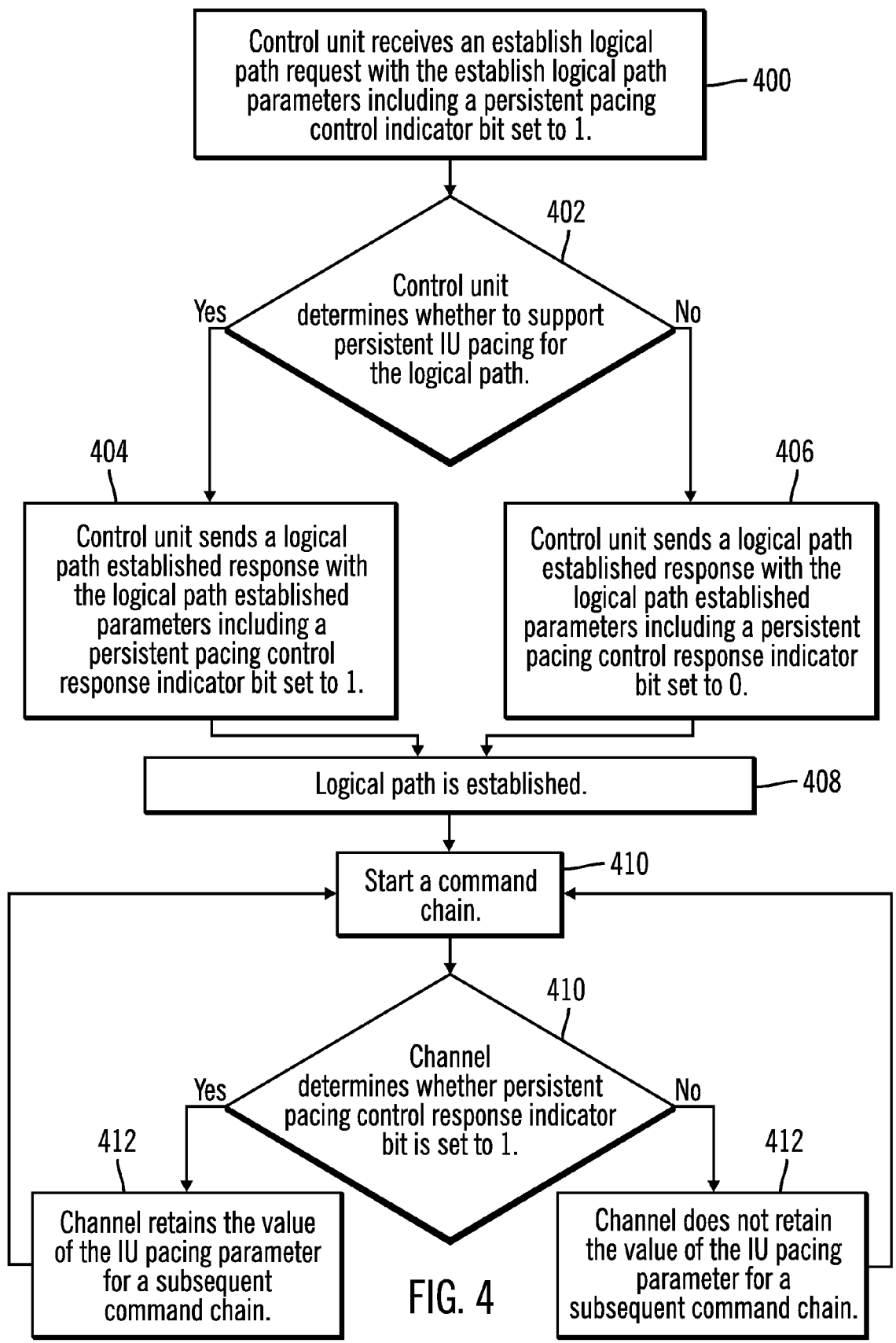
FIG. 4 illustrates a flowchart that shows operations for persistent information unit pacing, in accordance with certain embodiments.

FIG. 4 illustrates a flowchart that shows operations for persistent information unit pacing, in accordance with certain embodiments. The operations illustrated in FIG. 4 may be implemented in the computing environment 100 by the channel 200 and the control unit 202.

Control starts at block 400, where the control unit 202 receives an establish logical path request 204 with the establish logical path parameters 208 including a persistent pacing control indicator bit 210 set to one. The control unit 202 determines (at block 402) whether to support persistent information unit pacing for the logical path that may be established between the control unit 202 and the channel 200 that may have sent the establish logical path request 204 to the control unit 202.

If the control unit 202 determines (at block 402) that persistent information unit pacing is to be supported for the logical path, then the control unit 202 sends (at block 404) a logical path established response 206 with the logical path established parameters 212 including a persistent pacing control response indicator bit 214 set to one. If the control unit 202 determines (at block 402) that persistent information unit pacing is not to be supported for the logical path, then the control unit 202 sends (at block 406) a logical path established response 206 with the logical path established parameters 212 including a persistent pacing control response indicator bit 214 set to zero. Control proceeds to block 408 from blocks 404 and 406, and a logical path is established (at block 408) between the channel 200 and the control unit 202. In alternative embodiments other relationships besides a logical path may be established between the channel 200 and the control unit 202.

The channel 200 starts (at block 410) a command chain from the channel 200 to the control unit 202, where a command chain may comprise a sequence of a plurality of channel command words that are sent from the channel 200 to the control unit 202. The channel 200 determines (at block 410) whether the persistent pacing control response indicator bit 214 is set to one. If the persistent pacing control response indicator bit 214 is set to one, then the channel 200 retains (at block 412) the value of the information unit pacing parameter 308 for a subsequent command chain and control returns to block 412. If the persistent pacing control response indicator bit 214 is not set to one, then the channel 200 does not retain (at block 414) the value of the information unit pacing parameter 308 for a subsequent command chain and control returns to block 412.

Therefore, FIG. 4 illustrates certain embodiments in which persistent pacing of information units is implemented by the channel 200, in response to the persistent pacing control response indicator bit 214 being set to one by the control unit 202. The channel 200 retains the value of the information unit pacing parameter 308 for a subsequent command chain if the control unit 202 indicates support when the logical path is established by using the establish logical path request 204 and the logical path established response 206.

While FIG. 4 provides an exemplary embodiment in which the persistent pacing capability is exchanged within the context of using an establish logical path request and a logical path established response, the indicators to negotiate persistent pacing could be exchanged using other means such as via login negotiations or by using extended link services. Therefore, in certain embodiments in which a control unit receives a request to establish a relationship (where a logical path may be an exemplary relationship), over a fibre channel connection, a first indicator associated with the request can indicate that the relationship supports persistent information unit pacing across a plurality of command chains. The control unit can send a response indicating an acceptance of the relationship, wherein a second indicator associated with the response can indicate that the control unit supports persistent information unit pacing across the plurality of command chains. An information unit pacing parameter value may be retained across the plurality of command chains, in response to determining that the second indicator indicates that the control unit supports persistent information unit pacing across the plurality of command chains.

In certain embodiments, the control unit 202 may change the pacing count according to the rules set forth in FC-SB-3. However, the channel 200 will retain the value of the information unit pacing parameter 308 until the information unit pacing parameter 308 is changed again by the control unit 202. In order to avoid resetting the pacing count to the default, the control unit 202 retains its desired setting and include this value in the information unit pacing parameter 308 for all command response information units 306 and status information units in which the information unit pacing parameter 308 is valid.

The control unit 202 may decrease the IU pacing count to either the default value corresponding to the channel 200, or to a value chosen by the control unit 202. In certain embodiments, the channel 200 honors the new pacing count for the remainder of the current channel program. The channel 202 needs to use the new modified pacing value when starting a new operation.

In the existing FC-SB-3 architecture, the span of the modified pacing count ends at the completion of a channel program or at the closing of the outbound exchange. To allow the pacing count to persist as the new pacing count for continued operations on the same logical path, certain embodiments return the pacing count to the default value. Should the control unit 202 recognize a condition under which the control unit 202 cannot continue to accept new channel programs with the currently allowed pacing count, the control unit 202 may reset the pacing count to the default value by specifying an information unit pacing parameter 308 of zero. This zero value for the information unit pacing parameter 308 is presented in a first command response information unit 306, if the control unit 202 is able to execute the current operation, or in a status information unit that indicates a control unit busy status, if the control unit is not able to continue with the operation due to limited resources. A system reset on the logical path caused by any method allowed by the FICON architecture may reset the pacing count for that logical path to the default value.

In certain additional embodiments, as an alternative to retaining the value of information unit pacing parameter 308 on a logical path basis, the value of the information unit pacing parameter 308 could be retained on a physical path basis. In such embodiments, all operations between a given N_port pair are governed by the same pacing count.

Additional Embodiment Details

The described techniques may be implemented as a method, apparatus or article of manufacture involving software, firmware, micro-code, hardware and/or any combination thereof. The term "article of manufacture" as used herein refers to code or logic implemented in a medium, where such medium may comprise hardware logic [e.g., an integrated circuit chip, Programmable Gate Array (PGA), Application Specific Integrated Circuit (ASIC), etc.] or a computer readable medium, such as magnetic storage medium (e.g., hard disk drives, floppy disks, tape, etc.), optical storage (CD-ROMs, optical disks, etc.), volatile and non-volatile memory devices [e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.]. Code in the computer readable medium is accessed and executed by a processor. The medium in which the code or logic is encoded may also comprise transmission signals propagating through space or a transmission media, such as an optical fiber, copper wire, etc. The transmission signal in which the code or logic is encoded may further comprise a wireless signal, satellite transmission, radio waves, infrared signals, Bluetooth, etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may comprise a combination of hardware and software components in which the code is embodied, processed, and executed. Of course, those skilled in the art will recognize that many modifications may be made without departing from the scope of embodiments, and that the article of manufacture may comprise any information bearing medium. For example, the article of manufacture comprises a storage medium having stored therein instructions that when executed by a machine results in operations being performed.

Certain embodiments can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, certain embodiments can take the form of a computer program product accessible from a computer usable or computer readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries. Additionally, a description of an embodiment with several components in communication with each other does not imply that all such components are required. On the contrary a variety of optional components are described to illustrate the wide variety of possible embodiments.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently.

When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article. The functionality and/or the features of a device may be alternatively embodied by one or more other devices which are not explicitly described as having such functionality/features. Thus, other embodiments need not include the device itself.

Figure 5:
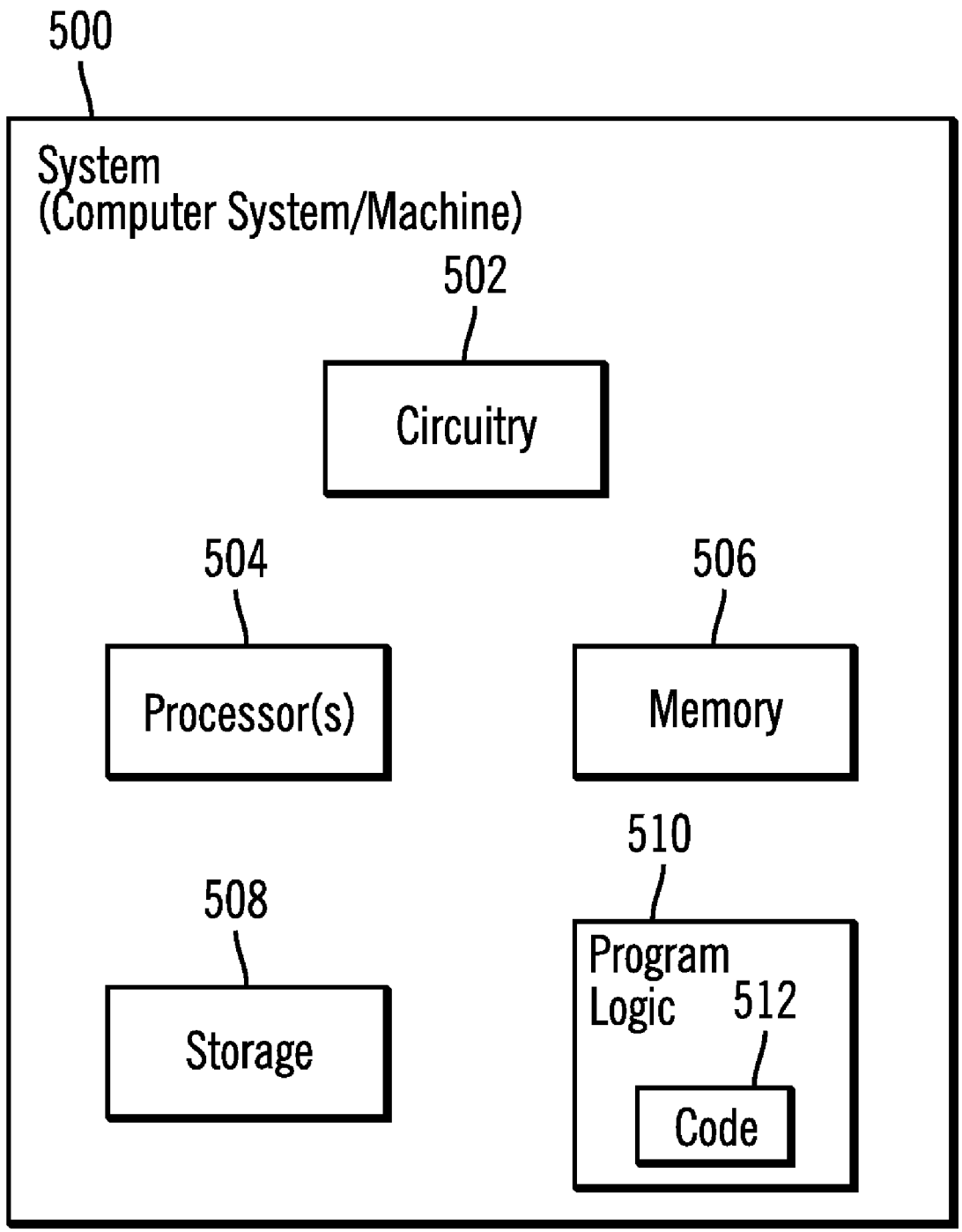
FIG. 5 illustrates the architecture of computing system, wherein in certain embodiments elements of the computing environment of FIG. 1 may be implemented in accordance with the architecture of the computing system.

FIG. 5 illustrates an exemplary computer system 500, wherein in certain embodiments the remote host 102 and the storage controller 104 of the computing environment 100 of FIG. 1 may be implemented in accordance with the computer architecture of the computer system 500. The computer system 500 may also be referred to as a system, and may include a circuitry 502 that may in certain embodiments include a processor 504. The system 500 may also include a memory 506 (e.g., a volatile memory device), and storage 508. Certain elements of the system 500 may or may not be found in the remote host 102 and the storage controller 104 of FIG. 1. The storage 508 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 508 may comprise an internal storage device, an attached storage device and/or a network accessible storage device. The system 500 may include a program logic 510 including code 512 that may be loaded into the memory 506 and executed by the processor 504 or circuitry 502. In certain embodiments, the program logic 510 including code 512 may be stored in the storage 508. In certain other embodiments, the program logic 510 may be implemented in the circuitry 502. Therefore, while FIG. 5 shows the program logic 510 separately from the other elements, the program logic 510 may be implemented in the memory 506 and/or the circuitry 502.

Certain embodiments may be directed to a method for deploying computing instruction by a person or automated processing integrating computer-readable code into a computing system, wherein the code in combination with the computing system is enabled to perform the operations of the described embodiments.

At least certain of the operations illustrated in FIG. 4 may be performed in parallel as well as sequentially. In alternative embodiments, certain of the operations may be performed in a different order, modified or removed.

Furthermore, many of the software and hardware components have been described in separate modules for purposes of illustration. Such components may be integrated into a fewer number of components or divided into a larger number of components. Additionally, certain operations described as performed by a specific component may be performed by other components.

The data structures and components shown or referred to in FIGS. 1-5 are described as having specific types of information. In alternative embodiments, the data structures and components may be structured differently and have fewer, more or different fields or different functions than those shown or referred to in the figures. Therefore, the foregoing description of the embodiments has been presented for the purposes of illustration and description. It is not intended to be exhaustive or to limit the embodiments to the precise form disclosed. Many modifications and variations are possible in light of the above teaching.

What is claimed is:

1. A method, comprising:
receiving, at a control unit, from a channel, a request to establish a relationship over a connection, wherein a first indicator associated with the request indicates that the relationship supports persistent information unit pacing across a plurality of command chains;
sending, by the control unit, to the channel, a response indicating an acceptance of the relationship, wherein a second indicator associated with the response indicates whether the control unit supports persistent information unit pacing across the plurality of command chains;
establishing the relationship and subsequent to establishing the relationship starting a first command chain;
determining, by a channel, from the second indicator whether the control unit supports persistent information unit pacing across the plurality of commands chains;
retaining, by the channel, an information unit pacing parameter value for a subsequent command chain to the first command chain, in response to determining by the channel that the second indicator indicates that the control unit supports persistent information unit pacing across the plurality of command chain, wherein the information unit pacing parameter value is set to a number that is different from a default value, wherein the default value is sixteen, and wherein the information unit pacing parameter value indicates the number of information units that are allowable to be in flight at any time for a command chain of the plurality of command chains; and
avoiding retaining, by the channel, the information unit pacing parameter value for the subsequent command chain to the first command chain, in response to determining by the channel that the second indicator indicates that the control unit does not support persistent information unit pacing across the plurality of command chains.

2. The method of claim 1, wherein the connection is a fibre channel connection, wherein the first indicator and the second indicator are included as an enhancement to a fibre channel protocol, wherein the enhancement to the fibre channel protocol supports persistent information unit pacing across the plurality of command chains, wherein the relationship is a logical path, wherein the request comprises an establish logical path function in the fibre channel protocol, wherein the response is a logical path established response in the fibre channel protocol, wherein parameters of the establish logical path function and the logical path established response include the first and the second indicators, and wherein the first and the second indicators are bits.

3. The method of claim 2, wherein a command chain comprises a sequence of commands, the method further comprising:
starting a first sequence of commands, wherein the information unit pacing parameter value indicates the number of information units that are allowable to be in flight across the fibre channel connection during a processing of the first sequence of commands;
starting a second sequence of commands in response to a completion of the processing of the first sequence of commands, wherein the information unit pacing parameter value remains unchanged, and wherein the information unit pacing parameter value indicates the number of information units that are allowable to be in flight across the fibre channel connection during a processing of the second sequence of commands.

4. The method of claim 1, wherein the control unit is included in a storage controller, wherein the request is received from a remote host coupled to the storage controller, wherein the information unit pacing parameter value is retained either on a logical path basis or on a physical path basis, and wherein the information unit pacing parameter value is capable of being reset to the default value.

5. The method of claim 1, wherein:
the connection is a fibre channel connection;
the first indicator is a persistent pacing control indicator bit stored in establish logical path parameters of an establish logical path request; and
the second indicator is a persistent pacing control response indicator bit stored in logical path established parameters of a logical path established response.

6. A system, comprising:
a control unit;
a connection for communication with the control unit;
a processor in communication with the control unit; and
memory coupled to the processor, wherein the processor performs operations, the operations comprising:
receiving, at the control unit, from a channel, a request to establish a relationship over the connection, wherein a first indicator associated with the request indicates that the relationship supports persistent information unit pacing across a plurality of command chains;
sending, by the control unit, to the channel, a response indicating an acceptance of the relationship, wherein a second indicator associated with the response indicates whether the control unit supports persistent information unit pacing across the plurality of command chains;
establishing the relationship and subsequent to establishing the relationship starting a first command chain;
determining, by a channel, from the second indicator whether the control unit supports persistent information unit pacing across the plurality of commands chains;
retaining, by the channel, an information unit pacing parameter value for a subsequent command chain to the first command chain, in response to determining by the channel that the second indicator indicates that the control unit supports persistent information unit pacing across the plurality of command chain, wherein the information unit pacing parameter value is set to a number that is different from a default value, wherein the default value is sixteen, and wherein the information unit pacing parameter value indicates the number of information units that are allowable to be in flight at any time for a command chain of the plurality of command chains; and
avoiding retaining, by the channel, the information unit pacing parameter value for the subsequent command chain to the first command chain, in response to determining by the channel that the second indicator indicates that the control unit does not support persistent information unit pacing across the plurality of command chains.

7. The system of claim 6, wherein the connection is a fibre channel connection, wherein the first indicator and the second indicator are included as an enhancement to a fibre channel protocol, wherein the enhancement to the fibre channel protocol supports persistent information unit pacing across the plurality of command chains, wherein the relationship is a logical path, wherein the request comprises an establish logical path function in the fibre channel protocol, wherein the response is a logical path established response in the fibre channel protocol, wherein parameters of the establish logical path function and the logical path established response include the first and the second indicators, and wherein the first and the second indicators are bits.

8. The system of claim 7, wherein a command chain comprises a sequence of commands, the operations further comprising:
starting a first sequence of commands, wherein the information unit pacing parameter value indicates the number of information units that are allowable to be in flight across the fibre channel connection during a processing of the first sequence of commands;
starting a second sequence of commands in response to a completion of the processing of the first sequence of commands, wherein the information unit pacing parameter value remains unchanged, and wherein the information unit pacing parameter value indicates the number of information units that are allowable to be in flight across the fibre channel connection during a processing of the second sequence of commands.

9. The system of claim 6, wherein the control unit is included in a storage controller, wherein the request is received from a remote host coupled to the storage controller, wherein the information unit pacing parameter value is retained either on a logical path basis or on a physical path basis, and wherein the information unit pacing parameter value is capable of being reset to the default value.

10. The system of claim 6, wherein:
the connection is a fibre channel connection;
the first indicator is a persistent pacing control indicator bit stored in establish logical path parameters of an establish logical path request; and
the second indicator is a persistent pacing control response indicator bit stored in logical path established parameters of a logical path established response.

11. A method for deploying computing infrastructure, comprising integrating computer-readable code stored in a computer readable storage medium into a storage controller and a remote host, wherein the code in combination with the storage controller and the remote host is capable of performing:
receiving, at a control unit, from a channel, a request to establish a relationship over a connection, wherein a first indicator associated with the request indicates that the relationship supports persistent information unit pacing across a plurality of command chains;
sending, by the control unit, to the channel, a response indicating an acceptance of the relationship, wherein a second indicator associated with the response indicates whether the control unit supports persistent information unit pacing across the plurality of command chains;
establishing the relationship and subsequent to establishing the relationship starting a first command chain;
determining, by a channel, from the second indicator whether the control unit supports persistent information unit pacing across the plurality of commands chains;
retaining, by the channel, an information unit pacing parameter value for a subsequent command chain to the first command chain, in response to determining by the channel that the second indicator indicates that the control unit supports persistent information unit pacing across the plurality of command chain, wherein the information unit pacing parameter value is set to a number that is different from a default value, wherein the default value is sixteen, and wherein the information unit pacing parameter value indicates the number of information units that are allowable to be in flight at any time for a command chain of the plurality of command chains; and
avoiding retaining, by the channel, the information unit pacing parameter value for the subsequent command chain to the first command chain, in response to determining by the channel that the second indicator indicates that the control unit does not support persistent information unit pacing across the plurality of command chains.

12. The method for deploying computing infrastructure of claim 11, wherein the connection is a fibre channel connection, wherein the first indicator and the second indicator are included as an enhancement to a fibre channel protocol, wherein the enhancement to the fibre channel protocol supports persistent information unit pacing across the plurality of command chains, wherein the relationship is a logical path, wherein the request comprises an establish logical path function in the fibre channel protocol, wherein the response is a logical path established response in the fibre channel protocol, wherein parameters of the establish logical path function and the logical path established response include the first and the second indicators, and wherein the first and the second indicators are bits.

13. The method for deploying computing infrastructure of claim 12, wherein a command chain comprises a sequence of commands, the method further comprising:
starting a first sequence of commands, wherein the information unit pacing parameter value indicates the number of information units that are allowable to be in flight across the fibre channel connection during a processing of the first sequence of commands;
starting a second sequence of commands in response to a completion of the processing of the first sequence of commands, wherein the information unit pacing parameter value remains unchanged, and wherein the information unit pacing parameter value indicates the number of information units that are allowable to be in flight across the fibre channel connection during a processing of the second sequence of commands.

14. The method for deploying computing infrastructure of claim 11, wherein the control unit is included in the storage controller, wherein the request is received from the remote host, wherein the remote host is coupled to the storage controller, wherein the information unit pacing parameter value is retained either on a logical path basis or on a physical path basis, and wherein the information unit pacing parameter value is capable of being reset to the default value.

15. The method for deploying computing infrastructure of claim 11, wherein:
the connection is a fibre channel connection;
the first indicator is a persistent pacing control indicator bit stored in establish logical path parameters of an establish logical path request; and
the second indicator is a persistent pacing control response indicator bit stored in logical path established parameters of a logical path established response.

16. A computer readable storage, wherein the computer readable storage is selected from a group consisting of memory, magnetic storage, optical storage, volatile memory, and non-volatile memory, wherein machine readable instructions are stored in the computer readable storage, and wherein the machine readable instructions when executed cause operations on a computer, the operations comprising:
receiving, at a control unit, from a channel, a request to establish a relationship over a connection, wherein a first indicator associated with the request indicates that the relationship supports persistent information unit pacing across a plurality of command chains;

sending, by the control unit, to the channel, a response indicating an acceptance of the relationship, wherein a second indicator associated with the response indicates whether the control unit supports persistent information unit pacing across the plurality of command chains;

establishing the relationship and subsequent to establishing the relationship starting a first command chain;

determining, by a channel, from the second indicator whether the control unit supports persistent information unit pacing across the plurality of commands chains;

retaining, by the channel, an information unit pacing parameter value for a subsequent command chain to the first command chain, in response to determining by the channel that the second indicator indicates that the control unit supports persistent information unit pacing across the plurality of command chain, wherein the information unit pacing parameter value is set to a number that is different from a default value, wherein the default value is sixteen, and wherein the information unit pacing parameter value indicates the number of information units that are allowable to be in flight at any time for a command chain of the plurality of command chains; and avoiding retaining, by the channel, the information unit pacing parameter value for the subsequent command chain to the first command chain, in response to determining by the channel that the second indicator indicates that the control unit does not support persistent information unit pacing across the plurality of command chains.

17. The computer readable storage of claim 16, wherein the connection is a fibre channel connection, wherein the first indicator and the second indicator are included as an enhancement to a fibre channel protocol, wherein the enhancement to the fibre channel protocol supports persistent information unit pacing across the plurality of command chains, wherein the relationship is a logical path, wherein the request comprises an establish logical path function in the fibre channel protocol, wherein the response is a logical path established response in the fibre channel protocol, wherein parameters of the establish logical path function and the logical path established response include the first and the second indicators, and wherein the first and the second indicators are bits.

18. The computer readable storage of claim 17, wherein a command chain comprises a sequence of commands, the operations further comprising:

starting a first sequence of commands, wherein the information unit pacing parameter value indicates the number of information units that are allowable to be in flight across the fibre channel connection during a processing of the first sequence of commands;

starting a second sequence of commands in response to a completion of the processing of the first sequence of commands, wherein the information unit pacing parameter value remains unchanged, and wherein the information unit pacing parameter value indicates the number of information units that are allowable to be in flight across the fibre channel connection during a processing of the second sequence of commands.

19. The computer readable storage of claim 16, wherein the control unit is included in a storage controller, wherein the request is received from a remote host coupled to the storage controller, wherein the information unit pacing parameter value is retained either on a logical path basis or on a physical path basis, and wherein the information unit pacing parameter value is capable of being reset to the default value.

20. The computer readable storage of claim 16, wherein:
the connection is a fibre channel connection;
the first indicator is a persistent pacing control indicator bit stored in establish logical path parameters of an establish logical path request; and
the second indicator is a persistent pacing control response indicator bit stored in logical path established parameters of a logical path established response.

* * * * *